United States Patent [19]
Hogan

[11] Patent Number: 5,502,873
[45] Date of Patent: Apr. 2, 1996

[54] PET GROOMING DEVICE

[76] Inventor: Marianne Hogan, 5427 3rd Street West, Bradenton, Fla. 34207-3404

[21] Appl. No.: 355,086

[22] Filed: Dec. 12, 1994

Related U.S. Application Data

[63] Continuation-in-part of Ser. No. 223,142, Apr. 5, 1994, abandoned.

[51] Int. Cl.$^6$ ..................................................... A47L 9/06
[52] U.S. Cl. .................................. 15/393; 15/402; 15/410
[58] Field of Search ............................... 15/393, 410, 402

[56] References Cited

U.S. PATENT DOCUMENTS

| | | | |
|---|---|---|---|
| 2,017,780 | 10/1935 | Walters | 15/402 X |
| 2,655,147 | 10/1953 | Rohrer | 15/402 X |
| 2,780,829 | 2/1957 | Cohen | 15/393 X |
| 3,574,885 | 4/1971 | Jones | 15/393 |
| 4,190,924 | 3/1980 | Nicholson | 15/402 |

FOREIGN PATENT DOCUMENTS

| | | | |
|---|---|---|---|
| 12380 | 1/1956 | German Dem. Rep. | 15/393 |

OTHER PUBLICATIONS

The Kong Company Brochure "ZoomGroom" product 1993.

*Primary Examiner*—Chris K. Moore
*Attorney, Agent, or Firm*—Charles J. Prescott

[57] ABSTRACT

A device connectable to a vacuum source for loosening, gathering and suction removal of pet hair and the like from the pet and for simultaneous gentle pet massage. The device is molded as a single integral unit formed of resilient elastomeric material such as silicone and includes a plurality of spaced flexible conical shaped members downwardly extending from its main body. The lower tips of these conical members define a lower working surface and serve to simulate and gather loose pet hair, dander, skin flakes and the like while simultaneously massaging the pet. This debris is suctioned into an elongated downwardly open suction channel formed partially into a lower surface of, and extending along substantially the entire length of the main body. The suction channel extends downwardly below the lower surface of the main body toward but not to the working surface to establish a clearance gap for enhanced vacuum suctioning of the debris into the suction channel. One end of the suction channel is closed while the other end thereof is open, extending into a tubular extension to establish suction communication with a vacuum cleaner hose and the like. Enhanced gripping structural features formed into the body are also provided.

3 Claims, 1 Drawing Sheet

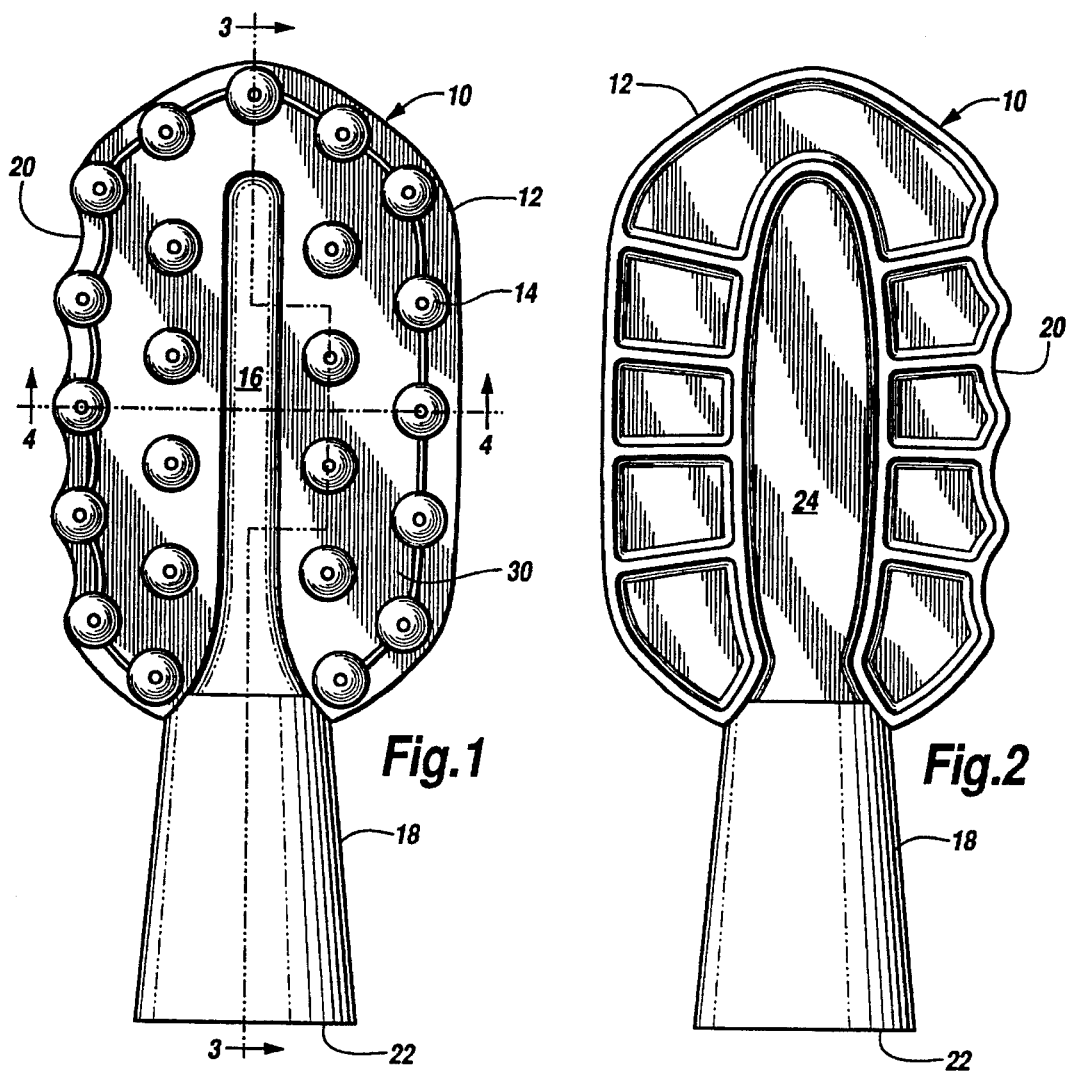
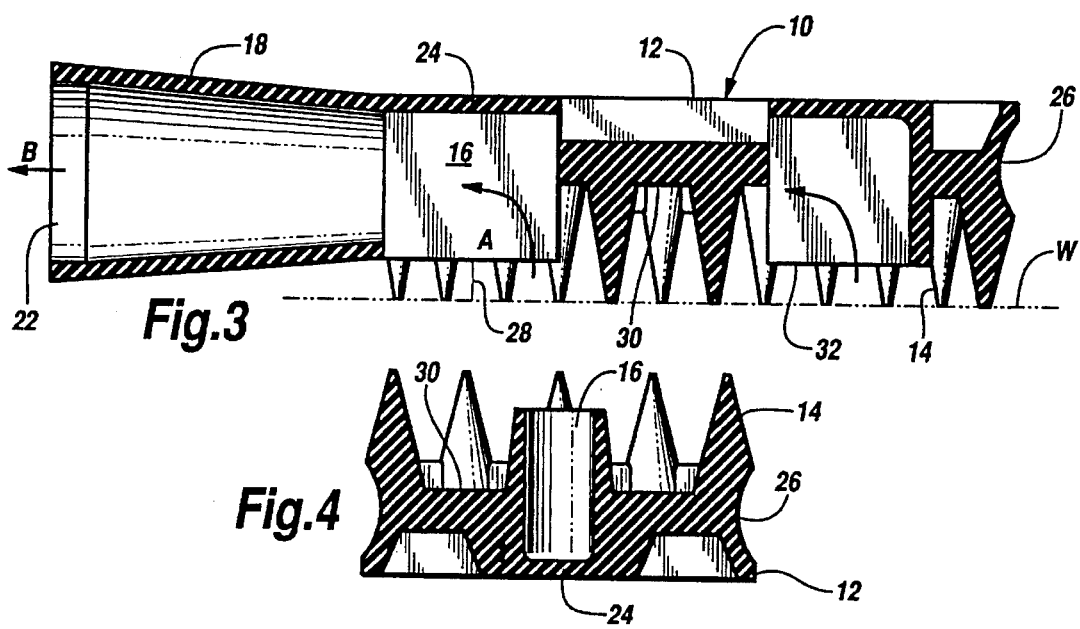

PET GROOMING DEVICE

This is a continuation-in-part of Ser. No. 08/223,142 originally filed Apr. 5, 1994 and now abandoned.

SCOPE OF INVENTION

This invention relates generally to pet grooming devices, and more particularly to a pet grooming device for loosening, gathering and vacuum removal of pet hair, dander, loose skin and the like while simultaneously gently massaging the pet.

PRIOR ART

As pets have become more popular throughout the years and the variety of pets has substantially increased, the availability of, and demand for care products for such pets has dramatically increased at the same time. Additionally, particular attention and care is given to domestic pets which are shown in competition.

The normal grooming steps for dogs and cats are brushing, bathing and trimming of the pet's hair. However, during brushing, the loose hair, dander and dried and flaking skin can easily become airborne and deposited on furniture and carpeting. Such debris is also well known to enflame allergies as well and may result in an owner having to remove such a pet from the household.

Thus, simple brushing of a household pet will likely result in the unpleasant side effects of dust and debris deposited on the furniture with the likelihood that someone in the family will be distressed by allergies of the airborne hair and dander.

A number of prior art devices incorporate a means for interconnection to a source of vacuum such as a vacuum cleaner hose in conjunction with a pet brush. The suction action in conjunction with the brushing helps to collect and remove the loose hair, dander and dried skin and the like before it becomes airborne. One such device is disclosed in U.S. Pat. No. 3,955,238 invented by Remijas which teaches a dog brush having arcuately formed bundles of bristles downwardly extending from a lower plate, the lower plate also including a plurality of evenly spaced apertures therethrough through which the suction action of a vacuum cleaner will collect the debris produced by brushing.

Carmack, in U.S. Pat. No. 2,953,808 teaches a circular shaped head with downwardly extending resilient fingers. A centrally positioned upright passageway connectable to a vacuum cleaner hose provides suction action for debris removal.

In U.S. Pat. No. 2,866,221, Warva also teaches a brush connectable to a vacuum cleaner hose for the suction removal of pet debris during brushing. A plurality of rows of apertures are formed between rows of bristles. These apertures, formed across the length and width of the head of the device, are in communication with a hollow interior thereof, the distal end of the handle of the device interconnectable to a vacuum cleaner hose and the like. An alternate embodiment of Warva also shows a plurality of longitudinal rows of hollow nipples, which nipples also serve to groom the pet, as well as to suction debris through the open ends of these hollow nipples.

In Cohen, U.S. Pat. No. 2,780,829 teaches a vacuum currycomb device for horses having an oval shaped vacuum head which includes a vertical perimeter rim downwardly extending, the rim having teeth to produce the currying action. A diagonally disposed centrally positioned hollow handle or neck is connectable to a vacuum cleaner hose and the like.

Nicholson, in U.S. Pat. No. 4,190,924 teaches an animal grooming device having a downwardly extending, uniquely configured skirt having circular apertures and triangular slots in combination with alternately placed triangular notches. The device is operably connectable by a horizontally extending cylindrically shaped suction nozzle to a vacuum cleaner hose.

In U.S. Pat. No. 3,668,736, Loscalzo teaches a grooming and cleaning device connectable to a vacuum cleaner hose and having a transverse row of downwardly extending chisel-shaped teeth disposed below the hollow vacuum chamber of the device for curry combing.

Other vacuum devices less similar to the present invention are disclosed for providing a device for vacuuming of pets as follows:

| Eremita | 5,074,006 |
| Dove | 3,626,546 |
| Shores | 4,630,329 |
| Armbruster | 4,729,147 |

The present device provides a compact easily hand grippable device for both vacuuming and grooming a pet, as well as for stimulating the skin of the animal. The device is integrally molded of resilient elastomeric material, preferably silicone and is integrally molded as a single unit for economy.

BRIEF SUMMARY OF THE INVENTION

This invention is directed to a device connectable to a vacuum source for loosening, gathering and suction removal of pet hair and the like from the pet and for simultaneous gentle pet massage. The device is molded as a single integral unit formed of resilient elastomeric material such as silicone and includes a plurality of spaced flexible conical shaped members downwardly extending from its main body. The lower tips of these conical members define a lower working surface and serve to simulate and gather loose pet hair, dander, skin flakes and the like while simultaneously massaging the pet. This debris is suctioned into an elongated downwardly open suction channel formed partially into a lower surface of, and extending along substantially the entire length of the main body. The suction channel extends downwardly below the lower surface of the main body toward but not to the working surface to establish a clearance gap for enhanced vacuum suctioning of the debris into the suction channel. One end of the suction channel is closed while the other end thereof is open, extending into a tubular extension to establish suction communication with a vacuum cleaner hose and the like. Enhanced gripping structural features formed into the body are also provided.

It is therefore an object of this invention to provide a single piece device for loosening, gathering and vacuum removal of pet hair and the like while simultaneously massaging the skin of the pet.

It is yet another object of this invention to provide a compact, generally flat elongated single piece pet grooming device conveniently connectable to a vacuum cleaner hose so as to position the hose extending directly away from the device to minimize pet and user disturbance during use.

It is yet another object of this invention to provide a pet grooming device connectable to a vacuum cleaner hose which is single handedly gripable during use.

In accordance with these and other objects which will become apparent hereinafter, the instant invention will now be described with reference to the accompanying drawings.

BRIEF DESCRIPTION OF THE DRAWINGS

FIG. 1 is a bottom plan view of the invention.

FIG. 2 is a top plan view of the invention.

FIG. 3 is a section view in the direction of arrows 3—3 in FIG. 1.

FIG. 4 is an inverted section view in the direction of arrows 4—4 in FIG. 1.

DETAILED DESCRIPTION OF THE INVENTION

Referring now to the drawings, the invention is shown generally at numeral 10 and is integrally molded as a single unit of flexible elastomeric material, preferably silicon. The device 10 generally includes a main body 12 having a generally elongated oblong configuration having a generally tubular extension 18 horizontally extending from one end thereof as shown. The extension 18 includes a distal cylindrical internal surface 22 adapted for connection onto one end of a vacuum cleaner hose (not shown) and the like.

An elongated narrow channel 16 is formed into main body 12, extending upwardly from a lower surface 30 thereof. This suction channel 16 longitudinally extends over substantially the entire length of the main body 12 and is centrally positioned between its longitudinal side surfaces. This suction channel 16 is closed adjacent one end of the main body 12 and opens into and is in fluid communication with the extension 18.

In addition to extending upwardly from the lower surface 30 of main body 12, the suction channel 16 extends downwardly to define a horizontal lower margin 32 thereof. Thus, suction channel 16 is of an overall height similar to the narrower end of extension 18 as best seen in FIG. 3 for providing efficient, unobstructed suction.

A plurality of integrally molded conically-shaped flexible members 14 are also provided. These flexible members 14 depend from the lower surface 30 of main body 12 and extend downwardly to a generally pointed lower distal tip thereof to collectively define a working surface shown in phantom at W in FIG. 3. These flexible members 14 are distributed along and within the perimeter of the main body 12, downwardly extending therefrom as shown and previously described.

The length of these conical flexible members 14 are such as to position the working surface W below the lower margin 32 of suction channel 16. This establishes a clearance gap 28 in FIG. 3 which facilitates the debris removal upwardly in the direction of arrow A into the suction channel 16 to be disposed of in the direction of arrow B into the vacuum cleaner hose (not shown).

To enhance the gripability of the device 10, an arcuately shaped concave groove 26 as seen in FIGS. 3 and 4 extends around substantially the entire perimeter of main body 12. To further enhance comfortable use of the device, fingertip grooves 20 evenly spaced along one longitudinal edge of the main body 12 as seen in FIGS. 1 and 2 are also provided.

It is here noted that, by the arrangement of the horizontally extending tubular extension 18 which has an overall diameter generally equal to the height between the upper surface of the main body 12 and working surface W, a more convenient arrangement for unobtrusively positioning the vacuum cleaner hose (not shown) during use is provided. The user's wrists and arms are much less likely to interfere with the vacuum cleaner hose (not shown) by this arrangement of elements of the device 10.

Importantly, by molding the device 10 of resilient elastomeric material such as silicon, the conically shaped members 14, having small flat pointed ends thereof, serve to both stimulate the debris of loose hair, dried skin and dander found on the skin of the pet, and also serve to simultaneously gently massage the pet during use of the device 10 as above described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A single-piece pet grooming device for loosening, gathering and vacuum removal of pet hair and the like, said device integrally molded of resilient elastomeric material comprising:

a molded main body having a generally flat, oblong plan view configuration;

a generally tubular extension dependent upon and horizontally extending from one end of said main body, an open distal end of extension connectable to a vacuum cleaner hose, said open distal end having a diameter generally equal to an overall height of said device;

said main body including a single elongated centrally positioned, longitudinal extending suction channel formed upwardly into said main body from a lower generally horizontal surface thereof, one end of said suction channel opening into said tubular extension and being closed and terminating at another end of said suction channel adjacent another end of said body;

said suction channel downwardly open and extending downwardly below said lower surface of said main body;

a plurality of spaced conically shaped downwardly extending flexible members each depending from said lower surface of said main body, a generally pointed lower distal tip of each of said plurality of flexible members generally collectively defining a lower working surface;

said flexible members being for loosening and gathering the pet hair and the like and for simultaneously gently massaging the pet;

said suction channel extending downwardly toward but not to said working surface to define a clearance gap therebetween;

a perimeter of said main body arcuately concaved inwardly to enhance stable hand gripping of said device during use;

one longitudinal side portion of said perimeter having inwardly extending arcuate finger tip recesses for added gripping stability.

2. A device as set forth in claim 1, wherein:

said tubular extension distal end is positioned and sized vertically to lie generally between said body upper surface and said lower plane.

3. A single-piece pet grooming device for loosening, gathering and vacuum removal of pet hair and the like, said device integrally molded of resilient elastomeric material comprising:

a main body means;

a single elongated suction channel means formed into a lower surface of, and extending longitudinally and centrally along substantially a length of, said main body means;

means extending from one end of said main body means for interconnecting one end of said suction channel means to a vacuum cleaner hose and the like;

a plurality of conical, flexible members depending and downwardly extending from said main body means, a lower distal tip of each of said plurality of flexible members collectively defining a working surface;

said suction channel means extending downwardly below said main body means toward, but not to, said working surface to define a clearance gap therebetween;

concave means formed into a perimeter of said body means for enhanced hand gripping;

finger tip recess means formed into one longitudinal side of said main body means for receiving a user's fingertips.

* * * * *